(12) United States Patent
Bodell et al.

(10) Patent No.: US 10,498,834 B2
(45) Date of Patent: Dec. 3, 2019

(54) METHOD AND APPARATUS FOR FACILITATING STATELESS REPRESENTATION OF INTERACTION FLOW STATES

(71) Applicant: [24]7.ai, Inc., San Jose, CA (US)

(72) Inventors: Michael Bodell, Santa Clara, CA (US);
Matthew Oshry, Albany, CA (US);
Ravali Devarapalli, San Jose, CA (US)

(73) Assignee: [24]7.ai, Inc., San Jose, CA (US)

( * ) Notice: Subject to any disclaimer, the term of this patent is extended or adjusted under 35 U.S.C. 154(b) by 184 days.

(21) Appl. No.: 15/083,240

(22) Filed: Mar. 28, 2016

(65) Prior Publication Data

US 2016/0294952 A1 Oct. 6, 2016

Related U.S. Application Data

(60) Provisional application No. 62/139,939, filed on Mar. 30, 2015.

(51) Int. Cl.
*H04L 29/08* (2006.01)
*G06Q 30/00* (2012.01)
*H04L 12/58* (2006.01)

(52) U.S. Cl.
CPC ......... *H04L 67/142* (2013.01); *G06Q 30/016* (2013.01); *H04L 51/046* (2013.01); *H04L 67/146* (2013.01)

(58) Field of Classification Search
None
See application file for complete search history.

(56) References Cited

U.S. PATENT DOCUMENTS

| | | | |
|---|---|---|---|
| 8,645,300 B1 | 2/2014 | Cowdrey et al. | |
| 2004/0215608 A1* | 10/2004 | Gourlay | G06F 17/30864 |
| 2006/0080664 A1* | 4/2006 | Jawahar | G06F 11/3495 |
| | | | 718/100 |
| 2007/0005646 A1* | 1/2007 | Dumais | G06F 17/30867 |
| 2009/0013255 A1 | 1/2009 | Yuschik et al. | |
| 2009/0164395 A1* | 6/2009 | Heck | G06F 17/30873 |
| | | | 706/16 |
| 2011/0208730 A1* | 8/2011 | Jiang | G06F 17/30864 |
| | | | 707/727 |

(Continued)

*Primary Examiner* — Hamza N Algibhah
*Assistant Examiner* — Tony Williams
(74) *Attorney, Agent, or Firm* — Perkins Coie LLP; Michael A. Glenn

(57) ABSTRACT

A computer-implemented method and an apparatus for facilitating stateless representation of interaction flow states associated with customer interactions includes effecting generation of a first uniform resource locator (URL) indicative of a textual input received from a customer during an online interaction. The first URL is configured to identify a state machine and a state within the state machine for facilitating processing of the textual input. An intention of the customer is predicted from the first URL using the state machine and the state within the state machine. At least one next action is determined based on the predicted intention. A second URL including a response to the textual input is generated. The response is determined based on the at least one next action. The second URL is configured to identify a next interaction state for the online interaction. The response is provisioned to the customer during the online interaction.

35 Claims, 9 Drawing Sheets

(56) References Cited

U.S. PATENT DOCUMENTS

| | | | |
|---|---|---|---|
| 2012/0011218 A1* | 1/2012 | Isaacs | G06F 17/30879 |
| | | | 709/217 |
| 2012/0076283 A1* | 3/2012 | Ajmera | G06Q 10/10 |
| | | | 379/93.17 |
| 2012/0265528 A1* | 10/2012 | Gruber | G10L 15/18 |
| | | | 704/235 |
| 2012/0272160 A1* | 10/2012 | Spivack | G06Q 10/10 |
| | | | 715/752 |
| 2013/0046544 A1 | 2/2013 | Kay et al. | |
| 2013/0091128 A1 | 4/2013 | Radinsky et al. | |
| 2013/0138593 A1* | 5/2013 | Miller | G06N 5/02 |
| | | | 706/46 |
| 2013/0191185 A1* | 7/2013 | Galvin | G06Q 10/10 |
| | | | 705/7.37 |
| 2013/0343534 A1* | 12/2013 | Nguyen | H04M 3/5191 |
| | | | 379/265.09 |
| 2013/0346886 A1 | 12/2013 | Cauchois et al. | |
| 2014/0019116 A1* | 1/2014 | Lundberg | G06F 17/28 |
| | | | 704/8 |
| 2014/0215316 A1* | 7/2014 | Guo | G06F 17/30876 |
| | | | 715/241 |
| 2014/0222503 A1* | 8/2014 | Vijayaraghavan | G06Q 30/0201 |
| | | | 705/7.29 |

\* cited by examiner

METHOD AND APPARATUS FOR FACILITATING STATELESS REPRESENTATION OF INTERACTION FLOW STATES

CROSS REFERENCE TO RELATED APPLICATIONS

This application claims priority to U.S. provisional patent application Ser. No. 62/139,939, filed Mar. 30, 2015, which is incorporated herein in its entirety by this reference thereto.

TECHNICAL FIELD

The invention generally relates to customer interaction management and more particularly to a method and apparatus for facilitating stateless representation of interaction flow states associated with online customer interactions.

BACKGROUND

Enterprises, nowadays, provide dedicated customer sales and service support to existing/potential customers (hereinafter referred to as 'customers') in order to improve chances of sale and/or improve customer interaction experience.

The provisioning of sales and service support to the customers may be facilitated through various resources, such as for example applications, which are configured to maintain interaction flow information associated with customer interactions in order to provide seamless support to the customers.

Typically, conventional applications use either a state machine or explicit rules or conditions for representing interaction flow information associated with customer interactions.

In case of usage of state machines for representing interaction flow information, a persistent connection between a client (for example, a customer) and a server (associated with the enterprise) has to be maintained for every interaction session in order to track interaction flow information and provide seamless support to the customer. Persistent connections are also referred to herein as stateful connections.

It is often difficult to maintain and provide stateful connections or to reconnect the customer to the same server if there occurs a turn in the connection or if the connection is disengaged. Restarting the interaction with the customer may ruin an interaction experience for the customer, as the customer may have to first wait in a queue to get connected to a server and thereafter repeat his or her concern to a customer support representative. In many example scenarios, the customer may exit the interaction, perhaps never to return.

Accordingly, there is a need to provide assistance to the customer in an efficient and seamless manner. Further, there is a need to maintain interaction flow information associated with online customer interactions while precluding the need to maintain persistent or stateful connections. Furthermore, there is a need to provide support for long running customer interactions, which are currently difficult to support on account of challenges in maintaining stateful connections.

SUMMARY

In an embodiment of the invention, a computer-implemented method for facilitating stateless representation of interaction flow states associated with online customer interactions is disclosed. The method effects generation of a first uniform resource locator (URL) indicative of a textual input received from a customer during an online interaction. The first URL is configured to identify a state machine and a state within the state machine for facilitating processing of the textual input. The method predicts an intention of the customer from the first URL using the state machine and the state within the state machine. The method determines at least one next action based on the predicted intention of the customer. The method generates a second URL including a response to the textual input. The response to the textual input is determined based on the at least one next action. The second URL is configured to identify a next interaction state for the online interaction. The method effects a provisioning of the response to the customer during the online interaction.

In another embodiment of the invention, an apparatus for facilitating stateless representation of interaction flow states associated with online customer interactions includes at least one processor and a memory. The memory stores machine executable instructions therein, that when executed by the at least one processor, causes the apparatus to effect generation of a first uniform resource locator (URL) indicative of a textual input received from a customer during an online interaction. The first URL is configured to identify a state machine and a state within the state machine for facilitating processing of the textual input. The apparatus predicts an intention of the customer from the first URL using the state machine and the state within the state machine. The apparatus determines at least one next action based on the predicted intention of the customer. The apparatus generates a second URL including a response to the textual input. The response to the textual input is determined based on the at least one next action. The second URL is configured to identify a next interaction state for the online interaction. The apparatus effects a provisioning of the response to the customer during the online interaction.

In another embodiment of the invention, a computer-implemented method for facilitating stateless representation of interaction flow states associated with online customer interactions is disclosed. The method displays, by a chat client, a user interface (UI) on a device associated with a customer for facilitating a chat interaction between the customer and an agent. The method receives, by the chat client, a textual input provided by the customer within the UI. The method generates, by the chat client, a first uniform resource locator (URL) indicative of the textual input. The first URL is configured to identify a state machine and a state within the state machine related to the textual input. The method provisions, by the chat client, the first URL to an apparatus including the state machine for processing of the textual input.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
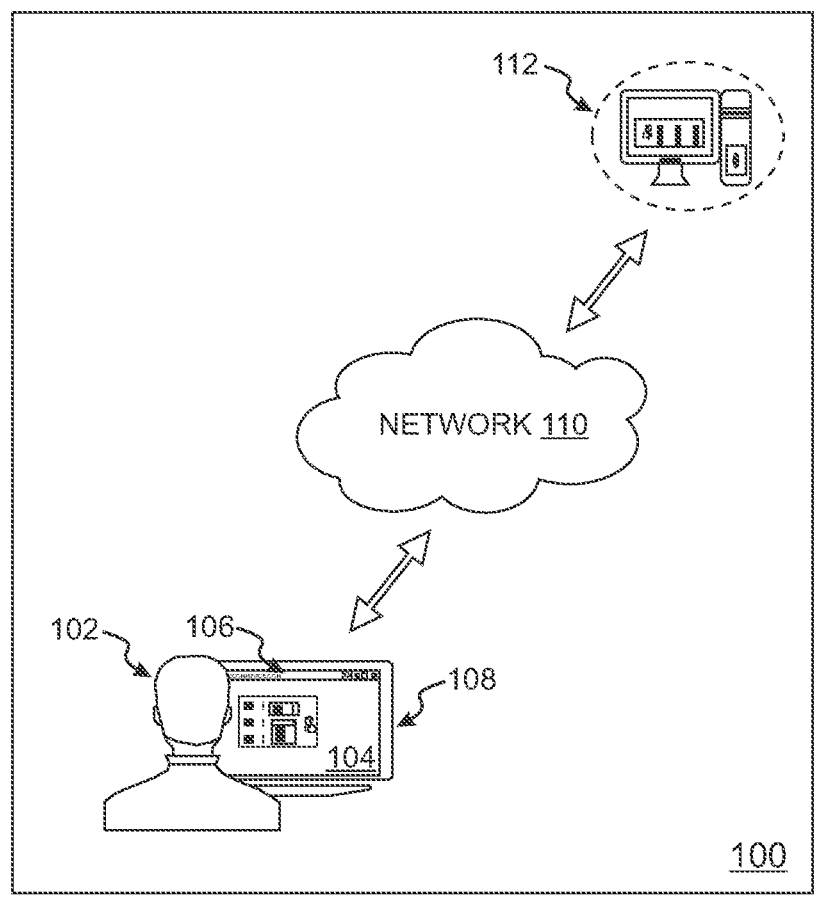
FIG. 1 is a schematic diagram showing an online visitor visiting a website associated with an enterprise, in accordance with an example scenario.

FIG. 1 is a schematic diagram 100 showing an online visitor 102 (hereinafter referred to as customer 102) visiting a website 104 associated with an enterprise, in accordance with an example scenario. The term 'enterprise' as used herein may refer to a corporation, an institution, a small/medium sized company or even a brick and mortar entity. For example, the enterprise may be a banking enterprise, an educational institution, a financial trading enterprise, an aviation company, a retail outlet or any such public or private sector enterprise. It is understood that many users may use products, services and/or information offered by the enterprise. The existing and/or potential users of the enterprise offerings are referred to herein as customers of the enterprise. It is also noted that the customers of the enterprise may not be limited to individuals. Indeed, in many example scenarios, groups of individuals or other enterprise entities may also be customers of the enterprise. It is understood that the enterprise may be associated with many such customers, such as the customer 102.

In FIG. 1, the schematic diagram 100 depicts the customer 102 accessing the website 104 using a web browser application 106 installed on the customer's desktop computer 108. In an example scenario, the website 104 may be embodied as an e-commerce portal and configured to offer enterprise products/services to existing/potential customers. However, the website 104 may not be limited to an e-commerce portal and some other non-limiting examples of the website 104 may include a financial/banking portal, a passenger travel website, a social networking website, news aggregator portal, a gaming or sports content related website, an educational portal and the like. Moreover, the website 104 may be hosted on a remote web server and the web browser application 106 may be configured to retrieve one or more web pages associated with the website 104 over a network 110. Examples of the network 110 may include wired networks, wireless networks or a combination thereof. Examples of wired networks may include Ethernet, local area networks (LANs), fiber-optic cable networks and the like. Examples of wireless network may include cellular networks like GSM/3G/4G/CDMA networks, wireless LANs, blue-tooth or Zigbee networks and the like. Examples of combination of wired and wireless networks may include the Internet.

In an example scenario, the enterprise may provide dedicated customer sales and service support to customers in order to improve chances of sale and/or improve customer interaction experience. The provisioning of sales and service support to the customers may be facilitated through various resources, such as for example applications, which are configured to maintain interaction flow information associated with customer interactions in order to provide seamless support to the customers.

Conventional mechanisms require persistent connections (also referred to herein as 'stateful connections') in order to maintain such interaction flow information. However, stateful connections are often difficult to maintain. This is further illustrated with reference to the following example. In an example scenario, the customer 102 may be interested in purchasing a product displayed on the website 104. Further, the customer 102 may wish to seek assistance in making the said purchase. For example, the customer 102 may need assistance in performing an online transaction for purchasing the product. In an example scenario, a clickable widget may be provisioned on the website 104, which may display a message, such as for example, 'How may I help you today?' or 'Speak with our representative'. Upon customer access of the widget (such as for example, by clicking on the widget), the customer 102 may be directed to a UI, such as for example, a chat client interface, for facilitating interaction of the customer 102 with a virtual agent, such as a virtual agent 112 depicted in FIG. 1. It is understood that an electronic device (or similar intelligent machine) may embody the virtual agent 112 as depicted in FIG. 1. In an example scenario, the customer 102 may input a message 'I need help in making a purchase with my credit card' in the chat client interface. In an example scenario, the virtual agent 112 may be configured to decipher the customer's query and serve a best-matched answer to the customer 102 from a database associated with the enterprise to assist the customer 102 in making the purchase.

Typically, in order to assist a virtual agent, such as the virtual agent 112, to serve the best-matched answer to the customer 102, an interaction flow associated with a customer interaction is represented either by using a state machine or by using rules or conditions, which are explicitly coded for such purposes. In case of usage of state machines for representing interaction flow, a stateful connection between the customer 102 and a server (associated with the enterprise) has to be maintained for every interaction session. Maintaining a persistent stateful connection may be useful in many cases. One such example case follows: In some cases, the virtual agent 112 may be incapable of addressing customer's concern adequately. For example, if the customer 102 has submitted a query such as 'I need help in making a purchase with my card', and the virtual agent 112 is not able to process what 'card' the customer 102 is referring to in the query, then in such cases, the customer 102 may need to be directed to a live agent (i.e. a human agent) in order to provide appropriate assistance to the customer 102. In such cases, the virtual agent 112 has to hand-off the interaction to a correct chat queue (or the server) and also pass context associated with the interaction between the customer 102 and the virtual agent 112 until the hand-off occurred, so that the live agent doesn't start the interaction from the very beginning. Maintaining a stateful session or a persistent connection enables smooth hand-off of the customer 102 from the virtual agent domain to the live agent. However, it is often difficult to maintain such hand-offs and provide stateful connection to the server or reconnect the customer 102 to the same server if there occurs a turn in the connection or if the connection is disengaged.

Also, in some cases, it is not feasible to have long running conversations with the customers on a stateful connection as it requires a connection to a single server to be maintained over a long period of time. Maintaining a connection to a single server for a long period of time may operationally be a challenge, as typically servers need to be restarted, upgraded, taken out of service or in some cases, the servers may also experience crash events. Furthermore, standard http/https connections are request/response based connections and, as such, are not structured to be maintained for a long period of time. In many cases, a customer involved in the interaction may have spotty connectivity (for example, on account of use of Wi-Fi or mobile internet connection, which may be interrupted at regular intervals). As a result, providing support for long running conversations is often a challenge on account of maintaining stateful connections for an elongated period of time.

Various embodiments of the present technology disclose techniques that are capable of overcoming these and other obstacles and providing additional benefits. More specifically, a method and apparatus disclosed herein suggest techniques for representing customer textual inputs and interaction flow information associated with customer interactions using uniform resource locators (URLs). The URLs are capable of invoking appropriate state machines and further identifying appropriate states within the state machines for enabling processing of customer textual inputs. Maintaining interaction flow information in such a manner precludes the need to maintain persistent or stateful connections as the URLs can be used to invoke the state machines even if there is a turn in connection or the connection is disengaged. Moreover, such URL representation of interaction flow information also lends itself to support long running interactions, such as for example email or short message service (SMS) related conversations between customers and agents, which is currently not feasible using conventional techniques requiring persistent or stateful connections. An example apparatus for facilitating representation of interaction flow states in a stateless manner is explained with reference to FIG. 2.

Figure 2:
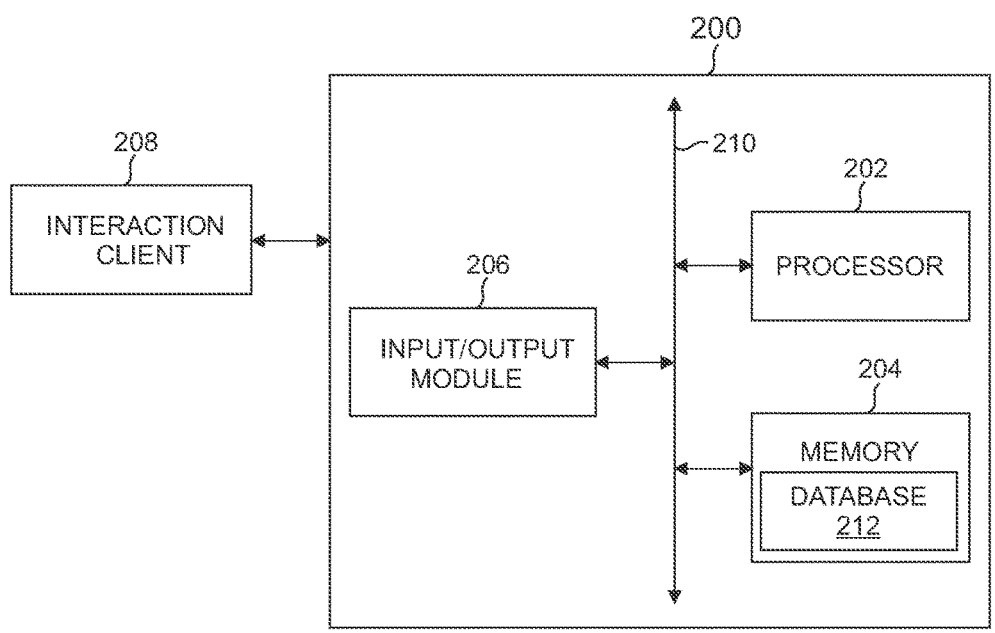
FIG. 2 is a block diagram of an apparatus configured to facilitate stateless representation of interaction flow states associated with online customer interactions, in accordance with an embodiment of the invention.

FIG. 2 is a block diagram of an apparatus 200 configured to facilitate stateless representation of interaction flow states associated with online customer interactions, in accordance with an embodiment of the invention. The term 'customers' as used herein may refer to both existing and potential users of products, services or information offered by an enterprise. Moreover, the term 'customers' of the enterprise may include individuals, groups of individuals, other organizational entities etc. As explained with reference to FIG. 1, the term 'enterprise' may refer to a corporation, an institution, a small/medium sized company or even a brick and mortar entity. For example, the enterprise may be a banking enterprise, an educational institution, a financial trading enterprise, an aviation company, a consumer goods enterprise or any such public or private sector enterprise.

The apparatus 200 includes at least one processor, such as a processor 202 and a memory 204. It is noted that although the apparatus 200 is depicted to include only one processor, the apparatus 200 may include a greater number of processors therein. In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

In at least one example embodiment, the memory 204 is configured to store a plurality of state machines capable of being invoked using uniform resource locators (URLs) as will be explained later. The memory 204 is further configured to maintain a database, such as the database 212, for storing a plurality of answers corresponding to a plurality of possible intentions of the plurality of customers of the enterprise. In at least one example embodiment, each possible customer intention and its corresponding answer are stored as an 'intent-answer' key value pair in the database 212. In at least one example embodiment, the memory 204 is further configured to store a plurality of natural language processing (NLP) models configured to facilitate natural language processing of the textual inputs received from the plurality of customers.

The apparatus 200 also includes an input/output module 206 (hereinafter referred to as 'I/O module 206') for providing an output and/or receiving an input. The I/O module 206 is configured to be in communication with the processor 202 and the memory 204. Examples of the I/O module 206 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

In an embodiment, the I/O module 206 may be configured to provide a user interface (UI) configured to enable enterprises to utilize the apparatus 200 for facilitating stateless representation of interaction flow states associated with the online customer interactions. Furthermore, the I/O module 206 may be integrated with a monitoring mechanism configured to provide the enterprises with real-time updates/alerts (for example, email notifications, SMS alerts, etc.) of changes to be made to the apparatus 200 for facilitating stateless representation of interaction flow states associated with customer interactions.

The I/O module 206 may further be configured to effect display of various user interfaces on remote devices. The remote devices may be customer-owned or customer-associated devices. In at least one example embodiment, the I/O module 206 may be configured to be in communication with an interaction client, such as an interaction client 208, including device application programming interfaces (APIs) capable of pushing content such as chat console UIs on customer devices for facilitating online interaction between a customer and an agent of the enterprise In an illustrative example, the I/O module 206 may be configured to facilitate downloading of an instance of a local application (for example, an application such as a chat client or even a voice assistant) by a customer on his or her electronic device. Such an application, now deployed in the customer's electronic device may serve as the interaction client 208. The interaction client 208 may be configured to enable online interaction, such as for example, a chat interaction or SMS/email interaction, between the customer and an agent associated with the enterprise for assisting a customer with his or her requirements.

In another illustrative example, the I/O module 206 may be configured to deploy an instance of a local application in a remote web server hosting web pages of an enterprise website. In such a scenario, the instance of the application disposed in the web server may serve as the interaction client 208. The interaction client 208 may be configured to display a widget on several web pages of the enterprise website. The widget, upon being hovered over or selected by the customer, may be configured to display a UI, such as a chat window to enable chat interaction between the customer and an agent associated with the enterprise.

In at least one example embodiment, the I/O module 206 may be configured to be in constant communication with the interaction client 208 for facilitating substantially real-time communication between the customer and the agent.

In an embodiment, various components of the apparatus 200, such as the processor 202, the memory 204 and the I/O module 206 are configured to communicate with each other via or through a centralized circuit system 210. The centralized circuit system 210 may be various devices configured to, among other things, provide or enable communication between the components (202-206) of the apparatus 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

It is understood that the apparatus 200 as illustrated and hereinafter described is merely illustrative of a system that could benefit from embodiments of the invention and, therefore, should not be taken to limit the scope of the invention. It is noted that the apparatus 200 may include fewer or more components than those depicted in FIG. 2. In an embodiment, the apparatus 200 may be implemented as a platform including a mix of existing open systems, proprietary systems and third party systems. In another embodiment, the apparatus 200 may be implemented completely as a platform including a set of software layers on top of existing hardware systems. In an embodiment, one or more components of the apparatus 200 may be deployed in a web server. In another embodiment, the apparatus 200 may be a standalone component in a remote machine connected to a communication network (such as the network 110 explained with reference to FIG. 1) and capable of executing a set of instructions (sequential and/or otherwise) so as to facilitate stateless representation of interaction flow states associated with online customer interactions. Moreover, the apparatus 200 may be implemented as a centralized system, or, alternatively, the various components of the apparatus 200 may be deployed in a distributed manner while being operatively coupled to each other. In an embodiment, functionalities of the apparatus 200 may also be embodied as a client within devices, such as customers' devices. In another embodiment, the apparatus 200 may be a central system that is shared by or accessible to each of such devices.

In an example scenario, a customer may access an enterprise website and click on a 'Help' icon or an 'Online Customer Support' button displayed on the enterprise website to initiate an interaction with an agent. In some scenarios, a floating widget may also be displayed on each web page of the enterprise website requesting the customer to click on a widget if they wish to interact with an agent of the enterprise for desired assistance. It is understood that the customers of the enterprise may seek assistance from the enterprise for various reasons, such as for example to enquire about billing or payment, to configure a product or troubleshoot an issue related to a product, to enquire about upgrades, to enquire about shipping of a product, to register a complaint etc.

Figure 3A:
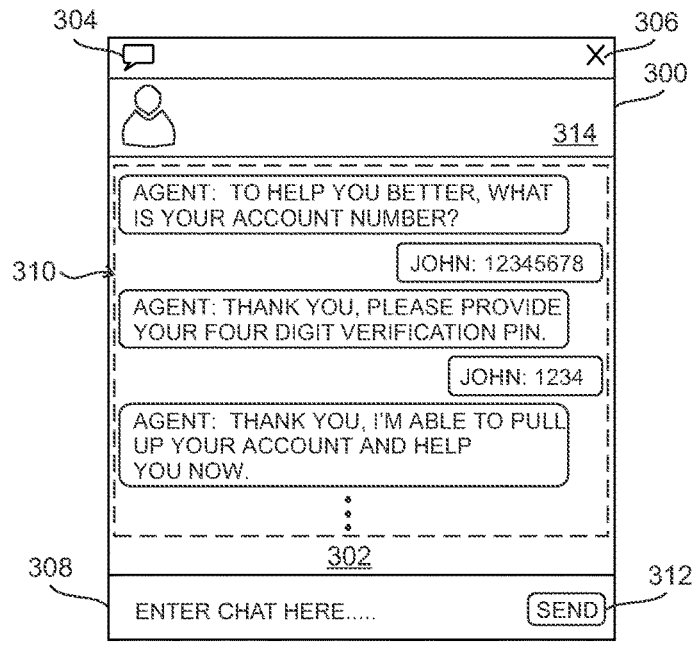
FIGS. 3A-3D show screenshots of a UI of a chat console displaying portions of example interactions between customers and an agent, in accordance with an example scenario.

In at least one example embodiment, an interaction between a customer and an agent may be represented using state machine involving a plurality of interaction flow states and several transitions amongst the interaction flow states. The interaction flow states associated with online customer interaction is further explained using an illustrative example in FIGS. 3A to 3D Referring to FIG. 3A, a screenshot of a UI 302 of a chat console 300 displaying a portion of an example interaction between a customer and an agent is shown, in accordance with an example scenario. In an illustrative scenario, the chat console 300 may be displayed in a minimized form on an enterprise website, for example, by the apparatus 200 using an interaction client, such as the interaction client 208 explained with reference to FIG. 2. It is understood that the customer may access the enterprise website using his or her electronic device. Some non-limiting examples of the electronic device may include a personal computer, a laptop, a Smartphone, a mobile phone, a tablet computer, a wearable device and a personal digital assistant. The chat console 300 may be configured to assume a regular form displaying the UI 302 upon receiving a customer input, such as a click on the minimized form of the chat console 300 indicative of the customer's desire to seek assistance from an agent associated with the enterprise. It is noted that FIG. 3A depicts a representation of the chat console 300 for illustration purposes and that the chat console 300 may not be limited to the illustration depicted in FIG. 3A. Indeed, many example text-based interaction platforms, such as instant messengers, relay chats, etc. may be used for facilitating chat interaction between the customer and the agent.

The chat console 300 is depicted to include a chat icon 304 indicative of an ongoing chat, an end chat option 306 capable of terminating the chat interaction and a text entry section 308 capable of receiving textual input from the customer. The text entry section 308 is further associated with a send button 312 indicative of customer confirmation of completion of text entry into the text entry section 308. In an example embodiment, the chat console 300 further displays a banner section 314, which may be configured to display a name and/or photo of an agent along with identifiers such as enterprise logo and the like.

The UI 302 is depicted to display the ongoing interaction 310 between a customer (exemplarily depicted to be 'John') and a virtual customer service representative (exemplarily depicted to be 'Agent'). The interaction 310 depicts the agent requesting an account number and a four-digit verification personal identification number (PIN) to authenticate John. In response, John is depicted to have provided his account number as well as his four-digit verification PIN to the agent. In an example scenario, the account number and the four-digit verification PIN match previously recorded information for John. John's credentials may then be authenticated and the interaction may be continued to enable John to seek desired assistance.

Figure 3B:
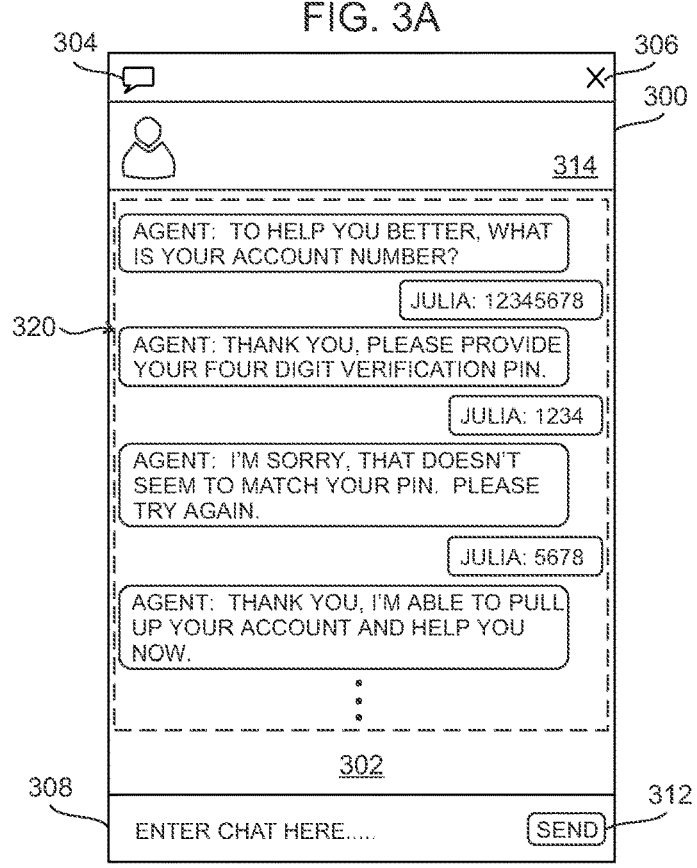

FIG. 3A depicts a scenario whereby a customer is authenticated at the first attempt itself. However, in some example scenarios, the customer authentication may involve several attempts. For example, the four-digit verification PIN provided by a customer may not match with his/her previously recorded account/PIN information and as such the authentication of customer's credentials may result in a failure. Such a scenario is depicted in FIG. 3B. More specifically, FIG. 3B shows a screenshot of the UI 302 of the chat console 300 displaying a portion of an example interaction 320 between a customer and the agent is shown, in accordance with another example scenario. More specifically, the UI 302 displays an ongoing interaction 320 between a customer 'Julia' and the virtual agent. The interaction 320 depicts the agent requesting an account number and a four-digit verification PIN to authenticate Julia. In response, Julia is depicted to have provided her account number as well as her four-digit verification PIN to the agent. In an example scenario, the four-digit verification PIN may not match previously recorded information for Julia. In such a scenario, Julia may be asked to provide the verification PIN again. Julia's subsequent provision of the four-digit verification PIN may be matched with the previously recorded information for Julia and upon successful match of the four-digit verification PIN, Julia's credentials may be authenticated.

Figure 3C:
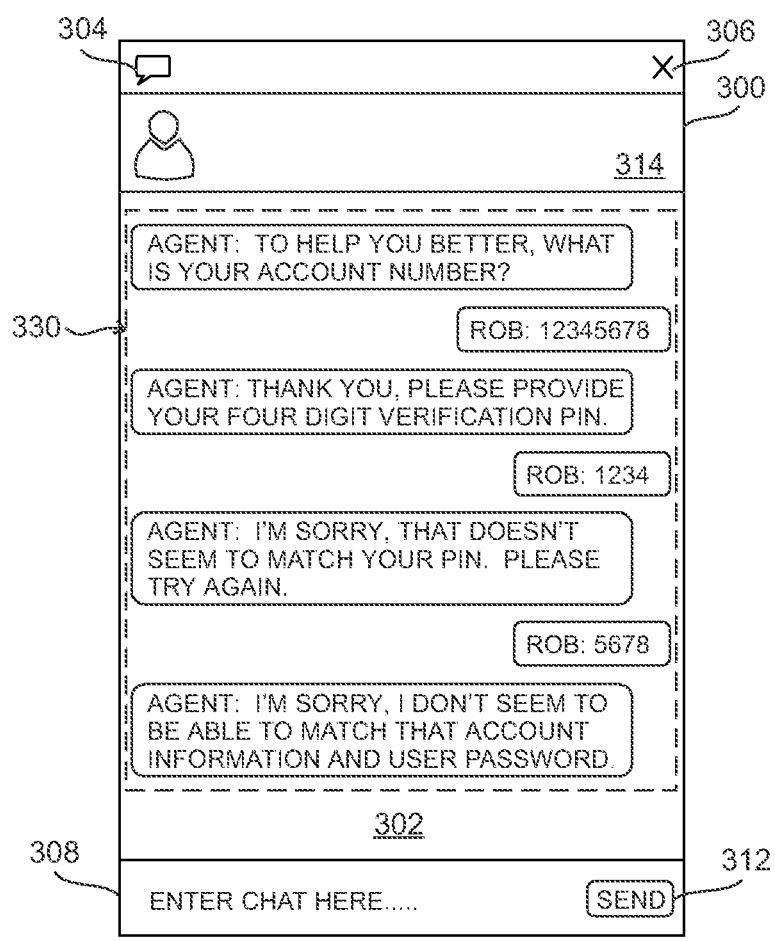

FIG. 3C shows a screenshot of the UI 302 of the chat console 300 displaying a portion of an example interaction 330 between a customer and the agent, in accordance with another example scenario. More specifically, the UI 302 displays an ongoing interaction 330 between a customer 'Rob' and the virtual agent. The interaction 330 depicts the agent requesting an account number and a four-digit verification PIN to authenticate Rob. In response, Rob is depicted to have provided his account number as well as his four-digit verification PIN to the agent. In an example scenario, the four-digit verification PIN may not match previously recorded information for Rob. In such a scenario, Rob may be asked to provide the verification PIN again. Rob's subsequent provision of the four-digit verification PIN may be matched with the previously recorded information for Rob and upon unsuccessful match of the four-digit verification PIN, Rob may be provided with an authentication failure message.

Figure 3D:
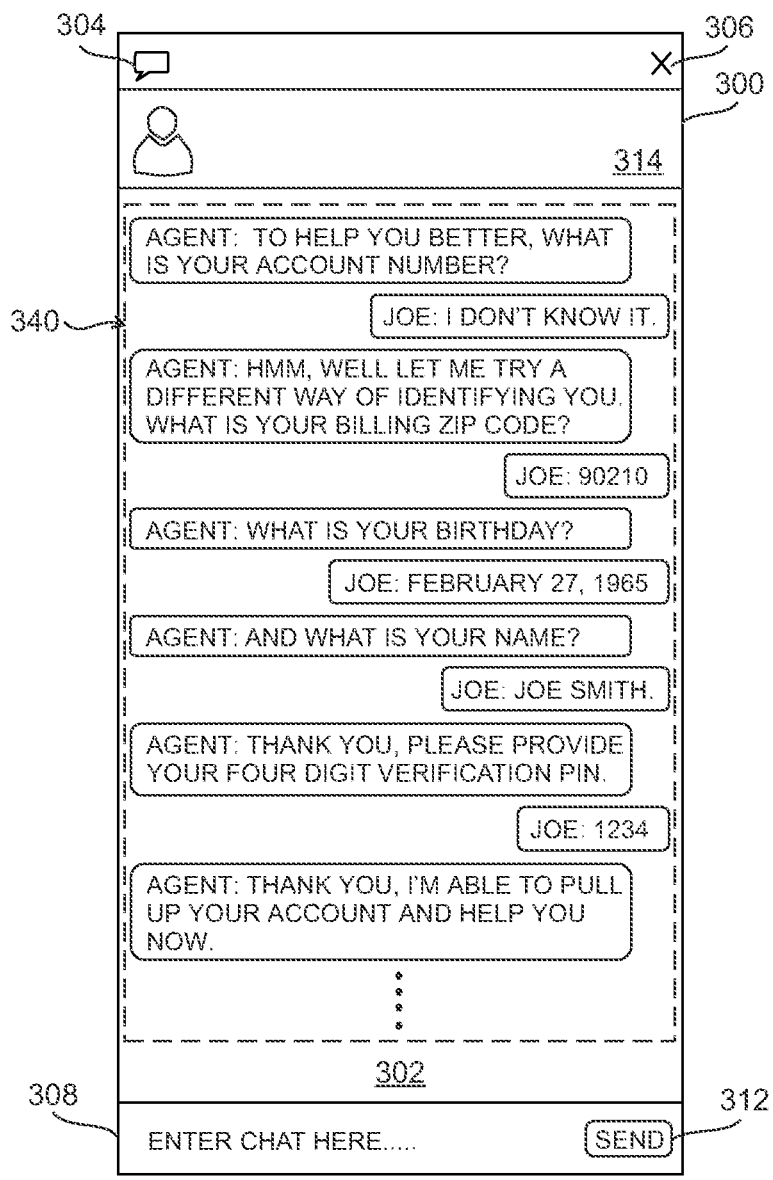

FIG. 3D shows a screenshot of the UI 302 of the chat console 300 displaying a portion of an example interaction 340 between a customer and the agent, in accordance with yet another example scenario. More specifically, the UI 302 displays an ongoing interaction 340 between a customer 'Joe' and the virtual agent. The interaction 340 depicts the agent requesting an account number from Joe. In response, Joe is depicted to have provided a response indicating that he doesn't remember his account number. In such a scenario, the agent may ask Joe for other information, such as his birth date, full name, zip code etc. to identify Joe's account number and thereafter request Joe to provide his four-digit verification PIN to the agent. Upon successful match of the answers with Joe's previously recorded information, Joe may be authenticated and the interaction may be continued to enable Joe to seek desired assistance.

As can be seen from interactions 310, 320, 330 and 340 shown in FIGS. 3A, 3B, 3C and 3D, respectively, a simple interaction between a customer and an agent, where a customer is asked to provide his account number and four-digit verification PIN by an agent may assume various forms or states. In at least one example embodiment, interaction flow (also referred to herein as conversational flow) associated with an interaction between a customers and an agent is represented using a state machine with a plurality of nodes configuring the various states within the state machine. In at least one example embodiment, the apparatus 200 explained with reference to FIG. 2 is configured to represent interaction flow states in a stateless manner as will be explained hereinafter. The term 'stateless representation' as used herein refers to a representation of interaction flow states associated with online customer interactions in a manner that precludes persistent connection between a customer and a server facilitating online interaction between a customer and the agent. Moreover, the term 'agent' as used hereinafter refers to virtual or an automated/machine agent engaged in customer support and service related activities unless the context suggests otherwise.

The stateless representation of interaction flow states associated with customer online interactions is explained hereinafter with reference to one customer seeking assistance from customer support offered by an enterprise. It is understood that interaction flow states associated with interactions of several customers may similarly be represented in a stateless manner.

In an illustrative example, a customer may wish to seek assistance from an agent associated with the enterprise. In an example scenario, the customer may wish to seek an online interaction, such as a chat interaction with the agent. Accordingly, the customer may either click on a customer support widget displayed on the enterprise website or seek chat interaction through a chat client loaded in the customer's electronic device. A UI of a chat console may accordingly be displayed on the customer's electronic device as exemplarily depicted in FIG. 4.

Figure 4:
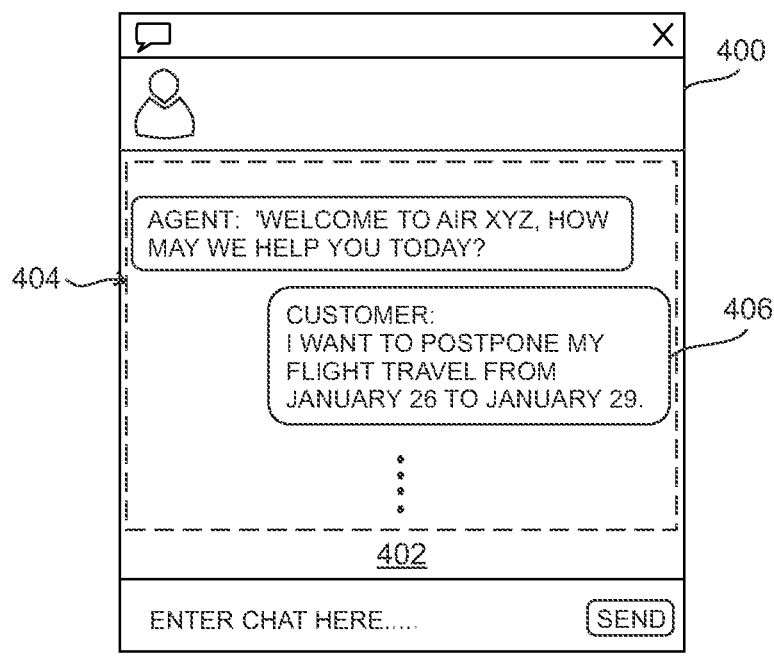
FIG. 4 shows a screenshot of a UI of a chat console displaying an ongoing interaction between a customer and a virtual agent, in accordance with another example scenario.

Referring now to FIG. 4, a screenshot of a UI 402 of a chat console 400 displaying an ongoing interaction between a customer and a virtual agent is shown, in accordance with another example scenario. The chat console 400 is similar in all aspects to the chat console 300 explained with reference to FIGS. 3A to 3D and is not explained again herein. The UI 402 depicts an ongoing chat interaction 404 between a virtual agent (exemplarily depicted in FIG. 4 as 'Agent') and a customer (exemplarily depicted in FIG. 4 as 'Customer'). The chat interaction 404 depicts the agent to have welcomed the customer and requested him to explain his requirement using the following text 'Welcome to Air XYZ. How may we help you today?' The customer is depicted to have provided a textual input 406 including the text 'I want to postpone my flight travel from January 26 to January 29'.

In at least one example embodiment, the chat client associated with the web server hosting the web pages of the website or the chat client installed on the customer's electronic device may be controlled using Rest application programming interface (APIs) by the apparatus 200 to push communication from the virtual agent to the customer and receive textual input, such as the textual input 406, from the customer. Moreover, the textual input received from the customer is provisioned by the chat client in a prescribed format to the I/O module 206 of the apparatus 200 explained with reference to FIG. 2. The prescribed format for provisioning customer textual inputs to the I/O module 206 of the apparatus 200 is further explained with reference to FIG. 2.

Referring back to FIG. 2, in at least one example embodiment, the processor 202 is configured to, with the content of the memory 204, cause the apparatus 200 to effect generation of a first uniform resource locator (URL) indicative of a textual input received from a customer during an online interaction. For example, a first URL may be generated which is indicative of customer textual input, such as the textual input 406 stating 'I want to postpone my flight travel from January 26 to January 29'. Furthermore, the first URL is also configured to identify a state machine and a state within the state machine for facilitating processing of the textual input. For example, a state machine may be associated with interaction flow associated with changes to booked flight reservations (such as for example, cancellations, delays, rescheduled bookings etc.). Furthermore, a state within such a state machine may be associated with rescheduling of flight itineraries. Accordingly, the apparatus 200 may be caused to effect generation of a URL, i.e. the first URL, such that the textual input along with the state machine and a state within the state machine related to the textual input are captured within the contents of the URL.

An example first URL that may be generated by the apparatus 200 using the interaction client, such as the chat client, identifying the state machine is depicted below:
"https://staging.api.enterpriseXYZ.net/v1/virtualagents/AirlineABC/rebookingflight?".

Further, post request parameters may be added to the above URL, such as for example,
"q=I+want+to+postpone+flight+travel+from+January+26+to+January+29&sessionid=111111111111&requestid=222222222222",
to indicate the textual input provided by the customer. It is understood that other URL notations may also be used as appropriate and it is understood that the above examples are merely illustrative and not exhaustive in nature.

Furthermore, in at least one example embodiment, the first URL is configured to facilitate authentication of the customer. For example, requisite API keys authenticating the customer may also be included within the first URL. In an embodiment, the I/O module 206 may be configured to receive the first URL including the API keys and perform authentication of the customer. For example:
api_key_=XXXXXXXXXXXX, where X may be any alpha-numeric character may be appended to the post request parameter, for example as depicted below:
"api_key=d34134fa43c6&q=I+want+to+postpone+flight+travel+from+January+26+to+January+29&sessionid=111111111111&requestid=222222222222", and appended to the first URL:
"https://staging.api.enterpriseXYZ.net/v1/virtualagents/AirlineABC/rebookingflight?".

It is understood that API keys are mentioned herein for example purposes and that the customer authentication may be performed using various other known techniques, such as for example, open authentication (OAuth), OAuth 2.0, password based authentication or shared key based authentication.

In at least one example embodiment, the customer may be identified from among the plurality of customers of the enterprise during the customer authentication. The identification of the customer may enable retrieval of customer related data stored in a customer relationship management (CRM) database in the memory 204 of the apparatus 200. Some non-limiting examples of the customer related data stored in the CRM database may include information, such as age/gender of the customer, browsing history of the customer, past interactions of the customer with agents, and the like.

In addition to facilitating customer authentication and identification, the first URL is further configured to identify the state machine as well as the state within the state machine. It is understood that the different states in the interaction may correspond to static representation of the states, such as for example states in a Finite State Machine (FSM). In an embodiment, the identified state machine is a Markov-model based state machine, where what happens next only depends on the current state, not on how the current state was reached at or other stateful data. Furthermore, the semantics of the states of the state machine are represented using state chart XML or SCXML.

In an embodiment, the processor 202 is configured to include a state chart extensible markup language (SCXML) interpreter capable of invoking an appropriate state machine from among a plurality of state machines stored in the memory 204 using the first URL to facilitate prediction of the intention of the customer. In an embodiment, the SCXML interpreter, in addition to including the ability to load a state machine via URL, may include the following functionality: (a) the ability to identify state in the state machine to interact with, which differs from conventional SCXML implementations, where the interaction is always started with an initial state which is hardcoded in the state machine; (3) the ability for the state machine when restarted this way to re-initialize a data model, thereby enabling the data model to contain constant strings; (4) include an event to fire into the state machine when the state machine is re-initialized, which allows the state machine author to interact with this process and set an appropriate data values; (5) include a scheme to enable the SCXML application author to signal time to return the result of the state machine to the requester; and (6) include code to automatically report the state machine URL and the state name in question.

In an embodiment, the SCXML interpreter is configured to select a natural language processing (NLP) model from among a plurality of NLP models stored in the memory 204 based on the identified state within the state machine in the first URL to facilitate prediction of an intention of the customer. More specifically, the textual input included in the first URL and the identified state within the state machine may be utilized by the SCXML interpreter to determine which NLP model to use for natural language processing of the textual input.

In an embodiment, textual input within the first URL may be processed using the selected NLP model by the processor 202 to understand the intention behind the textual input. In an embodiment, the NLP model may be configured to perform natural language processing of the textual input. For example, the NLP model may be configured to extract feature vectors by parsing and analyzing the free-form textual input. In an embodiment, the extraction of feature vectors (also referred to herein as 'features') is performed using statistical techniques. In at least one embodiment, the processor 202 is configured to extract one or more features from the textual input and associate intents with the extracted features. An example of a feature is:

WORD (reschedule) NEAR WORD (flight) WITH-IN_DISTANCE (2), which implies rescheduling flight travel. Accordingly, the feature 'reschedule flight' may be tagged with the intent of rescheduling flight travel. The processor 202 may be caused to identify one or more intents and tag the intents to the corresponding features extracted from the textual input.

In some embodiments, the processor 202 may be caused to compute a probability score for each intention. As explained above, the processor 202 is configured to identify the customer during customer authentication and retrieve information related to the customer, such as for example, information like age/gender of the customer, browsing history, past interaction information etc. from the CRM database. In at least one embodiment, the retrieved information may be used to compute a probability score for each intention. In at least one example embodiment, the processor 202 is configured to use machine-learning algorithms, such as Hidden Markov's Model (HMM) or Conditional Random Fields (CRF), to compute the probability of intention based on the customer historical behavior. In at least one example embodiment, the processor 202 is configured to rank the intents in the order of the probability scores and thereafter compare the probability score of the maximum scoring intent with a pre-defined threshold value (for example, a '0.9' value indicative of a 90% probability of occurrence of an event).

In an embodiment, the various NLP models may be structured as API services, such that a provisioning of textual input to a NLP model may return a list of best-matched intentions with confidence scores for the given textual input. In an embodiment, the processor is configured to learn the customer intention behind provisioning the textual input based on the list on best-matched intentions and decide on one or more next actions and the next interaction flow state. For example, based on the natural language processing of the textual input 406 stating 'I want to postpone my flight travel from January 26 to January 29', the processor 202 may learn that the customer intends to postpone his upcoming flight journey. Accordingly, the processor 202 may determine one or more next actions, based on information stored related to the corresponding state in the state machine. For example, a next action may involve rescheduling the flight journey to the requested date based on availability and previously recorded customer preferences (such as morning travel, seat preference etc.). In another illustrative example, a next action determined by the processor 202 may involve proposing another date if rescheduling the flight as per customer's requirement is not possible. In yet another illustrative example, a next action determined by the processor 202 may involve suggestions for airport transfers and hotel stay in addition to rescheduling of the upcoming flight journey as per the customer's requirement.

In an embodiment, the processor 202 is further configured to determine a next interaction state for the online interaction based on the current state within the state machine and predicted intention of the customer. For example, a next interaction state may relate to confirmation of the traveler details for the revised itinerary and generating of e-tickets for the customer. In an embodiment, the processor 202 is configured to provision the determined one or more next actions and the next interaction state to the I/O module 206.

In an embodiment, the processor 202 is configured to, with the content of the memory 204, cause the apparatus 200 to generate a second URL including the response to the textual input. More specifically, the I/O module 206 may generate the second URL including the response to the textual input. In at least one example embodiment, the I/O module 206 may be configured to determine the response to the textual input based on the next action(s). For example, based on the determined one or more next actions for the textual input 406 stating 'I want to postpone my flight travel from January 26 to January 29', the apparatus 200 may be caused to determine an appropriate response. In one illustrative example, an appropriate response may be to provide a confirmation of the request and suggest a revised itinerary to the customer. In another illustrative example, the response may be to transfer the interaction to a live agent (i.e. a human agent) to assist the customer in rescheduling the flight journey.

In an embodiment, the I/O module 206 is caused to determine if the next action(s) comprises an instruction to fetch an answer from a database. If the response includes an instruction to fetch answers from the database 212, then the I/O module 206 is configured to send a request to the memory 204 to fetch answers in text format (or other similar media types) that are available for a given customer intent. In an embodiment, the database 212 includes a repository of key-value pairs of intentions to answers for textual inputs related to a plurality of possible intentions of the customer. More specifically, for a given customer intention, the database 212 includes an answer best suited to address the intention. In an embodiment, the apparatus 200 is caused to compare the intention predicted for the customer with the plurality of possible intentions for a match and retrieve the answer corresponding to the matching intention from the database 212. The I/O module 206 may further be configured to embed the retrieved answer within the second URL as the response to the textual input. In an illustrative example, for the predicted intention of rescheduling of the flight journey, an example response included in the second URL may be 'Ok, our agent will contact you with possible flight options on the requested date within next four hours'.

It is noted that in some example embodiments, the apparatus 200 may be unable to adequately address a customer's inquiry. Such instances may occur on account of variety of reasons, such as for example, the database 212 may not cover the topic being addressed in the customer's inquiry, the customer's input isn't relevant to the application on the enterprise website or if the customer's inquiry isn't complete or very vague to decipher context from the input.

In such scenarios, the next action(s) may not include an instruction to fetch an answer from the database 212. In such a case, the I/O module 206 may be configured to include a standard response within the second URL. In an illustrative example, the response may be indicative of a transfer of the online interaction from the virtual agent to a live agent. For example, for the predicted intention of rescheduling of the flight journey, the response included within the second URL may be 'Ok, Agent John will now assist you with requested rescheduling of your flight itinerary'. In such cases, the response provided to the interaction client 208 may suggest directing the conversation to a live (or human) agent.

Further, the I/O module 206 may include parameters, such as for example, API Key, next interaction state, logging correlators and the like in the response. In an embodiment, the second URL is further configured to identify the next interaction state for the online interaction. As explained above, the processor 202 may determine the next interaction state for the online interaction and provision such information to the I/O module 206. The I/O module 206 may further be configured to include such information in the second URL. In an embodiment, the identification of the next interaction state within the second URL may be structured as a reference to a generic Markov style state machine and a specific state inside that state machine.

An example second URL that may be generated by the I/O module 206 of the apparatus 200, identifying the state machine is depicted below:
https://staging.api.enterpriseXYZ.net/v1/virtualagents/AirlineABC/rebookingflight/states/CT01_Itinerary Change
It is understood that other URL notations may also be used as appropriate and it is understood that the above examples are merely illustrative and not exhaustive in nature.

In at least one example embodiment, the processor 202 is configured to, with the content of the memory 204, cause the apparatus 200 to effect a provisioning of the response to the customer during the online interaction. More specifically, the I/O module 206 is configured to provision the generated second URL including the response to the interaction client 208. The apparatus 200 may thereafter effect a provisioning of the response to the customer during the chat interaction using the interaction client 208. For example, the interaction client 208 may strip the response from the second URL and provision the response as textual entry to be displayed (for example, within the chat console UI) on a device associated with the customer to provide assistance to the customer.

In an embodiment, the apparatus 200 is caused to effect generation of a URL for each subsequent textual input received from the customer during the chat interaction. The URL corresponding to the each subsequent textual input is configured to identify a respective state machine for facilitating processing of corresponding textual input. In an embodiment, the first URL and the URL for the each subsequent textual input is configured to identify a respective Markov-model based state machine.

In an embodiment, URLs corresponding to at least one pair of successive textual inputs during the chat interaction are configured to identify a same state machine. For example, for an ongoing chat interaction related to postponing of flight travel, successive textual inputs provided by the customer may be directed to the same state machine (i.e. a Markov state machine capable of processing textual inputs related to rescheduling of booked flight journeys) disposed in the memory 204 of the apparatus 200.

However, in some embodiments, URLs corresponding to at least one pair of successive textual inputs during the chat interaction are configured to identify different state machines for facilitating transitioning of the online interaction from one business context to another business context. For example, in some scenarios, a customer may wish to pay a credit card bill and also redeem accrued reward points. In such a scenario, upon addressing customer need related to payment of credit card bill, subsequent textual inputs related to the redeeming accrued reward points may be directed to a different state machine (i.e. a different Markov-model based state machine capable of processing textual inputs related to consumer benefits tied to usage of banking cards).

In some embodiments, a time duration between successive textual inputs may be long drawn out and extend over several hours or days. For example, unlike chat interactions where textual inputs are provided by the customer one after the other with very little time gap between successive textual inputs, some online interactions, such as short message service (SMS) interactions or email interactions may involve a gap of several hours or even days. In such cases, the URLs may be used to invoke state machines as and when textual inputs are received. As a result, the interaction flow may be deemed as stateless as no persistent or stateful connection to a server is required. An interaction session on a state machine of an enterprise server can stop and disappear at the point it returns a response to the interaction client 208. The interaction client 208 then can access any state machine (or instance of state machine on a different server) with the next request and jump into the state machine at that point. An example process flow for facilitating stateless representation of interaction flow states associated with online customer interactions is further explained with reference to FIG. 5.

Figure 5:
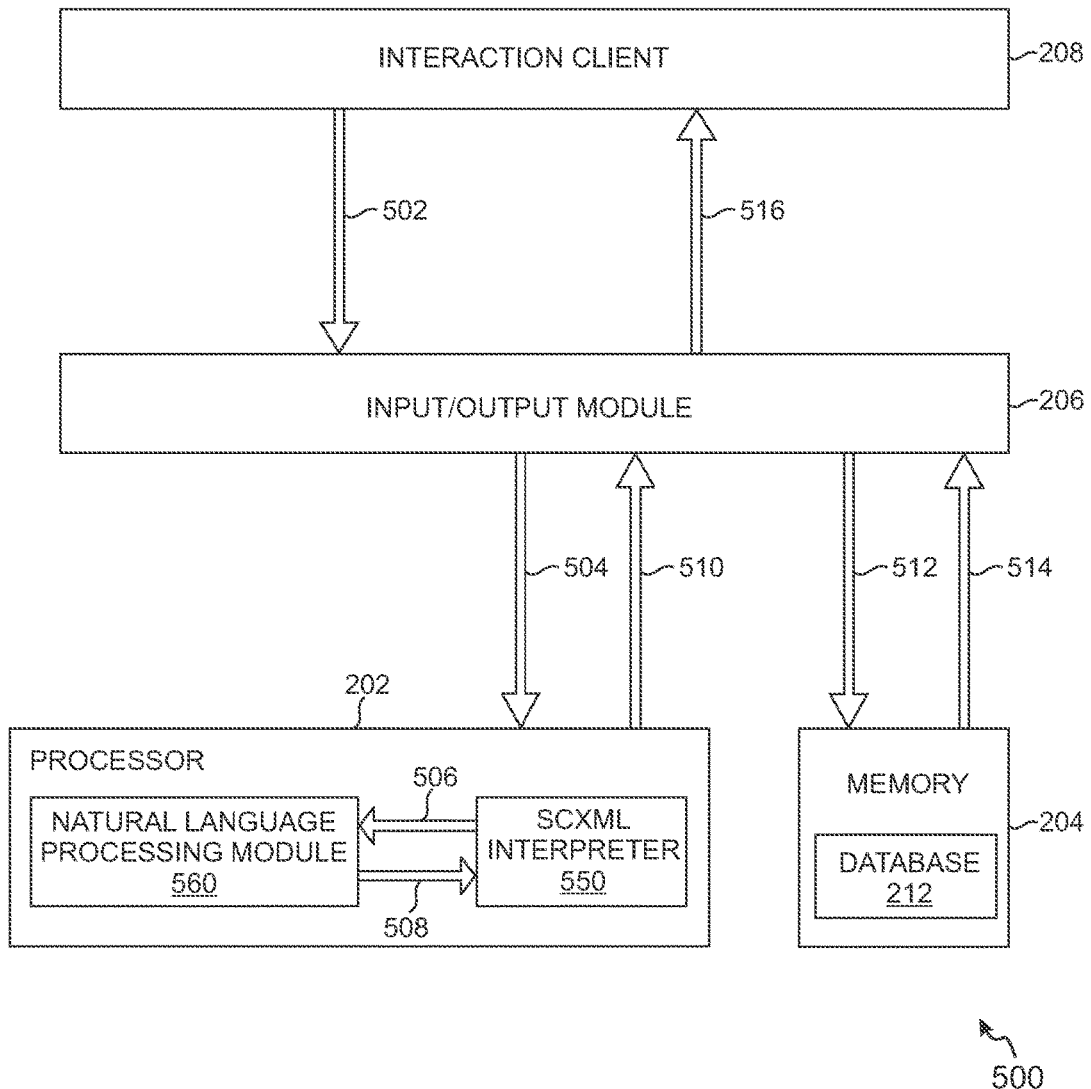
FIG. 5 shows a schematic diagram for illustrating an example process flow for facilitating stateless representation of interaction flow states associated with online customer interactions, in accordance with an embodiment of the invention.

FIG. 5 shows a schematic diagram for illustrating an example process flow 500 for facilitating stateless representation of interaction flow states associated with online customer interactions, in accordance with an embodiment of the invention. As explained with reference to FIG. 2, the interaction client 208 is configured to provision a UI, for example a UI associated with a chat console, to receive customer's textual input. In an example scenario, the customer may provide textual input, such as for example "How to improve my credit score?"

In an embodiment, the interaction client 208 may be caused by the apparatus 200 to effect generation of a first URL indicative of the textual input. The first URL may be further be configured to identify a state machine and a state within the state machine for facilitating processing of the textual input. For example, a first URL such as:
"https://staging.api.enterpriseXYZ.net/v1/virtualagents/BankDEF/credittracker?" may be appended with post request parameter, such as for example, "q=How+to+improve+my+credit+score" along with appropriate API keys and session/request id information.

At 502, the interaction client 208 is configured to send the first URL to the I/O module 206. The I/O module 206 is configured to check for correct API keys and perform authentication of the customer. Upon successful authentication, the I/O module 206 is configured to provision the information related to the textual input as well as the identified state machine and the state within the state machine to the processor 202 at 504.

As explained with reference to FIG. 2, the processor includes a SCXML interpreter, such as an SCXML interpreter 550, which is configured to invoke the state machine identified in the first URL. The SCXML interpreter 550 may utilize the textual input and the identified state machine to determine an appropriate NLP model for natural language processing of the textual input. At 506, the SCXML interpreter 550 is configured to provide the NLP model (retrieved from the memory 204) along with the textual input to a NLP module 560 (for example, a software program loaded from the memory 204 into the processor 202) to perform natural language processing of the textual input to predict the intention of the customer. Based on the model received from the SCXML interpreter 550, the NLP module 560 is configured to predict the intention of the customer, i.e. to improve her credit score. The NLP module 560 is also configured to determine a confidence score for the predicted intention (for example, a confidence score of 90 may be indicative of the fact that the predicted customer's intention is associated with a 90% level of certainty). At 508, the NLP module 560 is configured to provide the predicted intention along with the associated confidence score to the SCXML interpreter 550.

In an embodiment, the SCXML interpreter 550 within the processor 202, utilizing the state machine, may be configured to determine one or more next actions and the next interaction state based on the predicted intention received from the NLP module 560. The processor 202 is further configured to provide the determined one or more next actions and the next interaction state to the I/O module 206 at 510. For example, the SCXML interpreter 550 may determine that the customer should be advised to keep her outstanding bill amount low by making timely payments. The next state within the state machine and the action to be performed (for example, the advice to keep her outstanding bill amount low by making timely payments) may be provided to the I/O module 206.

The I/O module 206 is configured to receive the information provided by the processor 202 and further check if one or more next action(s) include instructions to fetch answers from the database 212. If a next action includes an instruction to fetch an answer from the database 212, then the I/O module 206 is configured to send a request, at 512, to fetch the answer from the database 212. For example, the exact textual answer to be provided to the customer for the identified intention of improving credit score may be stored in the database 212 as an intent-answer pair. The database 212 may provide the selected answer as an object to the I/O module 206 at 514. The I/O module 206 is configured to generate a second URL and embed the answer object as the response within a second URL. The second URL is also configured to include information related to the next interaction state (for example, identify a generic Markov style state machine and a specific state inside that state machine. An example, second URL generated by the I/O module 206 may be:

"https://staging.api.enterpriseXYZ.net/v1/virtualagents/
   BankDEF/credittracker/states/CT01_ScoreDifferent" or
   in another example scenario, the second URL may be:
"https://staging.api.enterpriseXYZ.net/v1/virtualagents/
   BankDEF/credittracker/d34134fa43c6/states/
   CT01_ScoreDifferent".

The I/O module 206 is configured to provision the second URL to the interaction client 208 at 516. The interaction client 208 may strip the response to be provided to the customer from the second URL and provide the response to the customer.

Moreover, the interaction client 208 may configure further textual inputs of the customer in form of URLs identifying generic Markov style state machine and specific states inside that state machine. The interaction client 208 may then access any state machine with the next request and jump into the state machine at that point. Accordingly, as explained above, the customer-agent conversations are handled using Markov state machine and Restful APIs, which utilize hyperlinks to represent interaction flow in a manner that doesn't require stateful sessions or persistent connections. A method for facilitating stateless representation of interaction flow states associated with online customer interactions is explained with reference to FIG. 6.

Figure 6:
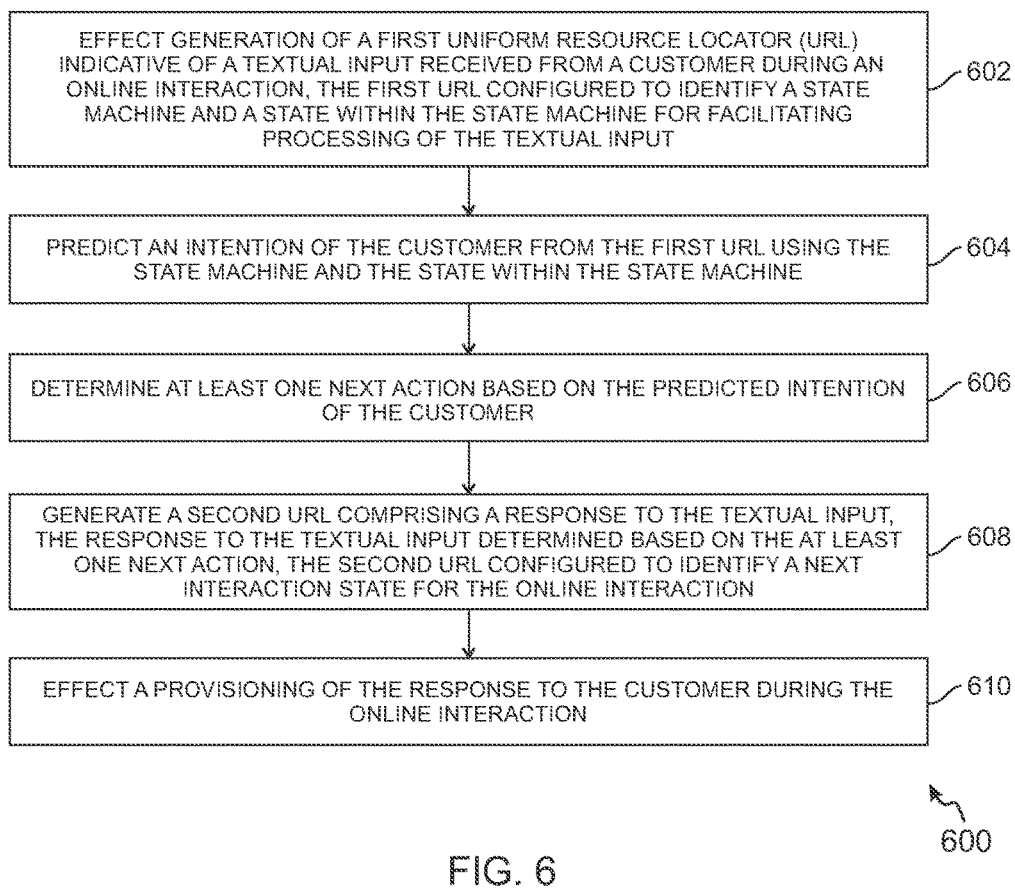
FIG. 6 is a flow diagram of an example method for facilitating stateless representation of interaction flow states associated with online customer interactions, in accordance with an embodiment of the invention.

FIG. 6 is a flow diagram of an example method 600 for facilitating stateless representation of interaction flow states associated with online customer interactions, in accordance with an embodiment of the invention. The method 600 depicted in the flow diagram may be executed by, for example, the apparatus 200 explained with reference to FIGS. 2 to 5. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the apparatus 200. It is noted that, the operations of the method 600 can be described and/or practiced by using a system other than the apparatus 200. The method 600 starts at operation 602.

At operation 602 of the method 600, generation of a first uniform resource locator (URL) indicative of a textual input received from a customer during an online interaction is effected. As explained with reference to FIGS. 1 and 2, customers may engage in online interactions, such as chat interactions or SMS/email interactions or in some cases even fill-up online questionnaires/web forms in order to seek assistance from the agents of the enterprise, who are entrusted with providing sales and service support to the customers. The textual input may be provided on a UI, such as the UI 302 or the UI 402, explained with reference to FIGS. 3A to 3D or FIG. 4, respectively. Upon reception of the textual input, the first URL may be generated which is indicative of the textual input. The first URL is further configured to identify a state machine and a state within the state machine for facilitating processing of the textual input as explained with reference to FIG. 1.

At operation 604 of the method 600, an intention of the customer is predicted from the first URL using the state machine and the state within the state machine. More specifically, information related to the textual input and the identified state machine along with the state within the state machine included in the first URL may be utilized to select an appropriate NLP model for processing of the textual input. The NLP model may then be utilized to perform natural language processing of the textual input so as to interpret the textual input and accordingly predict an intention of the customer based on the interpreted textual input.

At operation 606 of the method 600, at least one next action is determined based on the predicted intention of the customer. The predicted intention of the customer may be utilized by the state machine to determine the current state of the interaction and accordingly determine one or more next actions for the customer. In some embodiments, a next action may be to display a final answer to a customer's query, or alternatively, a next action may be to display a clarifying question or prompt the customer to move the interaction along to disambiguate the previous response. In some scenarios, a next action may be to suggest changing the interaction channel of the interaction (for example, transitioning the interaction to a human assisted chat) or it may involve providing a response to redirect the customer to a different URL or a different web site. In some scenarios, the next action may be to just acknowledging the input (like "Ok" or "Your welcome") or it may involve stating something like 'You are outside of business hours so we can't redirect you to a human agent' and the like.

At operation 608 of the method 600, a second URL including a response to the textual input is generated. More specifically, based on the one or more next actions, an appropriate response may be determined. A second URL including the response may be generated. Moreover, the second URL is configured to identify a next interaction state for the online interaction. In some embodiments, the response may include an instruction to fetch an answer from a database and embedding the answer as the response in the second URL. The fetching of the answer from the database and the generation of the second URL may be performed as explained with reference to FIGS. 2 and 5 and is not explained again herein.

At operation 610 of the method 600, a provisioning of the response to the customer is effected during the online interaction. More specifically, the response may be displayed within the UI as a reply to the textual input. Another method for facilitating stateless representation of interaction flow states associated with customer interactions is explained with reference to FIG. 7.

Figure 7:
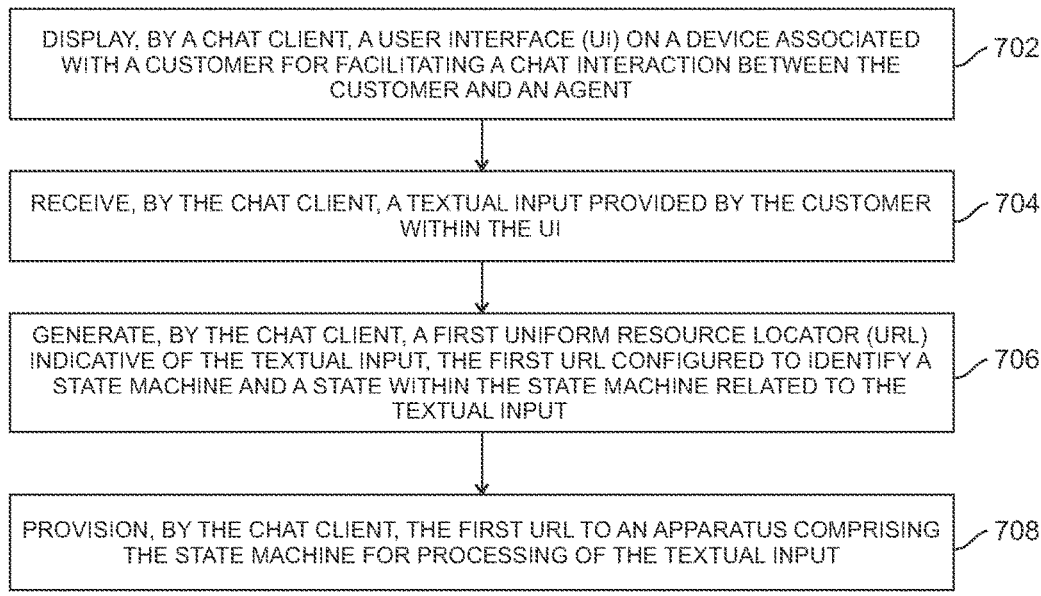
FIG. 7 is a flow diagram of an example method for facilitating stateless representation of interaction flow states associated with online customer interactions, in accordance with another embodiment of the invention.

FIG. 7 is a flow diagram of an example method 700 for facilitating stateless representation of interaction flow states associated with customer interactions, in accordance with an embodiment of the invention. The method 700 depicted in the flow diagram may be executed by, for example, the apparatus 200 explained with reference to FIGS. 2 to 5. Operations of the flowchart, and combinations of operation in the flowchart, may be implemented by, for example, hardware, firmware, a processor, circuitry and/or a different device associated with the execution of software that includes one or more computer program instructions. The method 700 starts at operation 702.

At operation 702 of the method 700, a user interface (UI) is displayed by a chat client on a device associated with a customer for facilitating a chat interaction between the customer and an agent. A UI, such as the UI 302 or the UI 402, explained with reference to FIGS. 3A to 3D or FIG. 4, respectively may be displayed to the chat client on the device associated with the customer. Some non-limiting examples of the device associated with the customer may include a personal computer, a laptop, a Smartphone, a mobile phone, a tablet computer, a wearable device, a personal digital assistant and the like.

At operation 704 of the method 700, a textual input provided by the customer within the UI is received by the chat client.

At operation 706 of the method 700, a first uniform resource locator (URL) indicative of the textual input is generated by the chat client. The first URL is configured to identify a state machine and a state within the state machine related to the textual input. The generation of the first URL may be performed as explained with reference to operation 602 of the method 600 in FIG. 6 and is not explained herein.

At operation 708 of the method 700, the first URL is provisioned to an apparatus, such as the apparatus 200, comprising the state machine by the chat client for processing of the textual input. Further, the processing of textual input to generate a reply to the textual input may be performed as explained with reference to FIGS. 2 to 5 and is not explained herein.

Without in any way limiting the scope, interpretation, or application of the claims appearing below, advantages of one or more of the exemplary embodiments disclosed herein facilitate representation of interaction flow states in customer interactions without having to maintain stateful sessions or persistent connections for the interactions. More specifically, a customer may be directed to any state machine or any server at any point during an on-going interaction without having to maintain a persistent connection with the customer. In an example scenario, a uniform resource locator (URL) may be directed to a different state machine in order to transition a customer session from one state machine (for example, a state machine that contains the conversation flow for a particular business domain) to a different state machine (for example, a state machine that contains the conversation flow for a different domain of that business), thereby supporting topic changes in a clean and efficient manner. In some cases, the customer may continue the interaction even after coming back after hours or days, since there is no persistent connection required and no server side state is needed for supporting the interaction. As such, techniques disclosed herein facilitate long running conversations between the virtual agents and the customers.

It is noted that though stateless representation of interaction flow states associated with customer interactions as described herein with reference to FIG. 1 to FIG. 7 are explained with reference to virtual agents, such representation of application flow states may not be limited to applications involving virtual agents. Indeed any application (including those which preclude agent related conversations) may incorporate techniques disclosed herein to represent application flow states in a RESTful and stateless manner. For example, business flow widgets assisting customers to fill online forms or answer questionnaires, such as those related to applying for credit or filing of taxes online, may utilize the techniques disclosed herein to represent the application flow states to facilitate seamless dialogue flow. For example, the questions presented to the customers in forms/questionnaires may be suitably modified in real-time based on answers provided to earlier questions and states corresponding to such application flow may be represented in a stateless manner as described above.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, as described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the apparatus 200, the processor 202, the memory 204 and the I/O module 206 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIGS. 6 and 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present disclosure, as discussed above, may be practiced with steps and/or operations in a different order, and/or with hardware elements in configurations, which are different than those which, are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method for facilitating a stateless representation of an interaction flow associated with an online customer interaction, the method, comprising:

effecting generation of a first uniform resource locator (URL) of the stateless representation for an interaction state of the interaction flow, the first URL being indicative of a textual input included in an online conversation between a customer and an agent corresponding to an online interaction such that the textual input is received from the customer during the online conversation and the first URL is configured to invoke a state machine and identify an interaction state within the state machine of the interaction flow for facilitating processing of the textual input;

predicting an intention of the customer from the first URL using the state machine and the interaction state within the state machine;

determining at least one next action input of the online interaction based on the predicted intention of the customer;

generating a second URL of the stateless representation for a next interaction state of the interaction flow, the second URL comprising a response by the agent to the textual input of the online interaction, the response to the textual input determined based on the at least one next action input of the online interaction, the second URL configured to identify a next interaction state for the online interaction; and effecting a provisioning of the response to the customer during the online interaction in accordance with the interaction flow;

selecting a natural language processing (NLP) model from among a plurality of NLP models based on the identified next interaction state within the state machine in the first URL; and performing NLP of the textual input by using the NLP model, wherein the intention of the customer is predicted based on the NLP of the textual input.

2. The method of claim 1, further comprising:

effecting generation of a URL for each subsequent textual input of the online interaction received from the customer during the online interaction, the URL corresponding to each subsequent textual input configured to identify a respective state machine for facilitating processing of corresponding textual input.

3. The method of claim 2, wherein generated URLs for at least one pair of successive textual inputs of the online interaction received from the customer during the online interaction are configured to identify a same state machine.

4. The method of claim 2, wherein generated URLs for at least one pair of successive textual inputs of the online interaction received from the customer during the online interaction are configured to identify different state machines for facilitating transitioning of the online interaction from one business context to another business context.

5. The method of claim 2, wherein the first URL and each subsequent URL for each subsequent textual input is configured to identify a respective Markov-model based state machine.

6. The method of claim 1, further comprising:

utilizing a state chart extensible markup language (SCXML) interpreter capable of invoking the state machine using the first URL to facilitate prediction of the intention of the customer, wherein the state machine is selected from among a plurality of state machines based on the first URL.

7. The method of claim 6, wherein the first URL is further configured to facilitate authentication of the customer, and, wherein the state machine is invoked for facilitating prediction of the intention of the customer upon successful authentication of the customer.

8. The method of claim 1, further comprising:

determining if the at least one next action comprises an instruction to fetch an answer from a database, wherein the database is configured to store a plurality of answers corresponding to a plurality of possible intentions of the customer;

comparing the intention predicted for the customer with each possible intention from among the plurality of possible intentions of the customer for a match; and retrieving an answer corresponding to a matching intention from the database, wherein the answer retrieved from the database is embedded within the second URL as the response to the textual input.

9. The method of claim 1, wherein the response is configured to be displayed as a textual entry on a device associated with the customer, the textual entry configured to provide assistance to the customer.

10. The method of claim 1, wherein the online interaction corresponds to a chat interaction between the customer and the agent, which is a virtual agent entrusted with providing customer support to the customer.

11. The method of claim 10, wherein the response is indicative of a transfer of the online interaction from the virtual agent to a live agent.

12. The method of claim 1, wherein the online interaction corresponds to one of a short message service (SMS) interaction and an email interaction between the customer and the agent, which is a virtual agent entrusted with providing customer support to the customer.

13. An apparatus for facilitating a stateless representation of an interaction flow associated with an online customer interaction, the apparatus comprising:
at least one processor; and
a memory having stored therein machine executable instructions, that when executed by the at least one processor, cause the apparatus to:
effect generation of a first uniform resource locator (URL) of the stateless representation for an interaction state of the interaction flow, the first URL being indicative of a textual input included in an online conversation between a customer and an agent corresponding to an online interaction such that the textual input is received from the customer during the online conversation and the first URL is configured to invoke a state machine and identify an interaction state within the state machine of the interaction flow for facilitating processing of the textual input;
predict an intention of the customer from the first URL using the state machine and the interaction state within the state machine;
determine at least one next action input of the online interaction based on the predicted intention of the customer;
generate a second URL of the stateless representation for a next interaction state of the interaction flow, the second URL comprising a response by the agent to the textual input of the online interaction, the response to the textual input determined based on the at least one next action input of the online interaction, the second URL configured to identify a next interaction state for the online interaction; and
effect a provisioning of the response to the customer during the online interaction in accordance with the interaction flow;
select a natural language processing (NLP) model from among a plurality of NLP models based on the identified next interaction state within the state machine in the first URL; and
perform NLP of the textual input by using the NLP model wherein the intention of the customer is predicted based on the NLP of the textual input.

14. The apparatus of claim 13, wherein the apparatus is communicably associated with an interaction client capable of displaying a user interface (UI) on a device associated with the customer for facilitating the online interaction with the customer.

15. The apparatus of claim 14, wherein the interaction client is configured to receive the textual input provided by the customer within the UI, and, wherein the generation of the first URL indicative of the textual input is effected by the apparatus using the interaction client.

16. The apparatus of claim 14, wherein the provisioning of the response to the customer is effected by the apparatus using the interaction client.

17. The apparatus of claim 4, wherein the apparatus is further caused to:
effect generation of a URL for each subsequent textual input of the online interaction received from the customer during the online interaction using the interaction client, the URL corresponding to each subsequent textual input configured to identify a respective state machine for facilitating processing of corresponding textual input.

18. The apparatus of claim 17, wherein generated URLs for at least one pair of successive textual inputs of the online interaction received from the customer during the online interaction are configured to identify a same state machine.

19. The apparatus of claim 17, wherein generated URLs for at least one pair of successive textual inputs of the online interaction received from the customer during the online interaction are configured to identify different state machines for facilitating transitioning of the online interaction from one business context to another business context.

20. The apparatus of claim 17, wherein the first URL and each URL for each subsequent textual input of the online interaction is configured to identify a respective Markov-model based state machine.

21. The apparatus of claim 13, wherein the at least one processor further comprises:
a state chart extensible markup language (SCXML) interpreter capable of invoking the state machine using the first URL to facilitate prediction of the intention of the customer, wherein the state machine is selected from among a plurality of state machines based on the first URL.

22. The apparatus of claim 21, wherein the first URL is further configured to facilitate authentication of the customer, and, wherein the state machine is invoked for facilitating prediction of the intention of the customer upon successful authentication of the customer.

23. The apparatus of claim 13, wherein the apparatus is further caused to:
determine if the at least one next action comprises an instruction to fetch an answer from a database, wherein the database is configured to store a plurality of answers corresponding to a plurality of possible intentions of the customer;
compare the intention predicted for the customer with each possible intention from among the plurality of possible intentions of the customer for a match; and
retrieve an answer corresponding to a matching intention from the database, wherein the answer retrieved from the database is embedded within the second URL as the response to the textual input.

24. The apparatus of claim 13, wherein the response is configured to be displayed as a textual entry on a device associated with the customer, the textual entry configured to provide assistance to the customer.

25. The apparatus of claim 13, wherein the online interaction corresponds to a chat interaction between the customer and the agent, which is a virtual agent entrusted with providing customer support to the customer.

26. The apparatus of claim 25, wherein the response is indicative of a transfer of the online interaction from the virtual agent to a live agent.

27. The apparatus of claim 13, wherein the online interaction corresponds to one of a short message service (SMS) interaction and an email interaction between the customer and the agent, which is a virtual agent entrusted with providing customer support to the customer.

28. The apparatus of claim 13, wherein the memory is further configured to store at least one of:
- a plurality of state machines, wherein one or more state machines from among the plurality of state machines are capable of being invoked for facilitating processing of textual inputs received from a plurality of customers based on URLs indicative of the respective textual inputs;
- a plurality of answers corresponding to a plurality of possible intentions of each customer from among the plurality of customers; and
- a plurality of natural language processing (NLP) models configured to facilitate natural language processing of the textual inputs received from the plurality of customers.

29. A computer-implemented method for facilitating a stateless representation of a chat interaction associated with an online customer interaction, the method comprising:
- displaying, by a chat client, a user interface (UI) on a device associated with a customer for facilitating a chat interaction between the customer and an agent;
- receiving, by the chat client, a textual input included in the chat interaction provided by the customer within the UI;
- generating, by the chat client, a first uniform resource locator (URL) of the stateless representation for an interaction state of the chat interaction, the first URL being indicative of the textual input, the first URL configured to invoke a state machine and identify an interaction state within the state machine of the chat interaction related to the textual input;
- provisioning, by the chat client, the first URL to an apparatus comprising the state machine for processing of the textual input in accordance with the chat interaction;

- selecting, by the chat client, a natural language processing (NLP) model from among a plurality of NLP models based on the identified interaction state within the state machine in the first URL; and
- performing, by the chat client, NLP of the textual input by using the NLP model wherein an intention of the customer is predicted based on the NLP of the textual input.

30. The method of claim 29, further comprising:
- effecting, by the chat client, generation of a URL for each subsequent textual input of the online interaction received from the customer during the chat interaction, each URL corresponding to each subsequent textual input configured to identify a respective state machine for facilitating processing of the corresponding textual input.

31. The method of claim 30, wherein generated URLs for at least one pair of successive textual inputs of the online interaction received from the customer during the chat interaction are configured to identify a same state machine.

32. The method of claim 30, wherein generated URLs for at least one pair of successive textual inputs of the online interaction received from the customer during the chat interaction are configured to identify different state machines for facilitating transitioning of the chat interaction from one business context to another business context.

33. The method of claim 30, wherein the first URL and each URL for each subsequent textual input is configured to identify a respective Markov-model based state machine.

34. The method of claim 29, further comprising: wherein the apparatus is caused to:
- predicting, by the chat client, predict an intention of the customer from the first URL using the state machine and the state within the state machine;
- determining, by the chat client, determine at least one next action based on the predicted intention of the customer;
- generating, by the chat client, generate a second URL comprising a response to the textual input, the response to the textual input determined based on the at least one next action, the second URL configured to identify a next interaction state for the online interaction; and
- provision the second URL to the chat client.

35. The method of claim 34, further comprising:
- receiving, by the chat client, the second URL comprising the response to the textual input; and
- displaying, by the chat client, the response to the customer within the UI during the chat interaction.

* * * * *